United States Patent
Stokes et al.

(10) Patent No.: US 11,742,583 B2
(45) Date of Patent: Aug. 29, 2023

(54) ANTENNA TESTING

(71) Applicant: Kymeta Corporation, Redmond, WA (US)

(72) Inventors: Taylor Stokes, Monroe, WA (US); JT Repp, Monroe, WA (US); Ron Radko, Kirkland, WA (US); Jonas Nicholson, Preston, WA (US); Alexander L. Bautista, Jr., Renton, WA (US)

(73) Assignee: Kymeta Corporation, Redmond, WA (US)

( * ) Notice: Subject to any disclaimer, the term of this patent is extended or adjusted under 35 U.S.C. 154(b) by 0 days.

(21) Appl. No.: 17/495,056

(22) Filed: Oct. 6, 2021

(65) Prior Publication Data

US 2022/0173518 A1 Jun. 2, 2022

Related U.S. Application Data

(63) Continuation of application No. 16/425,645, filed on May 29, 2019, now Pat. No. 11,165,160.
(Continued)

(51) Int. Cl.
*H01Q 13/10* (2006.01)
*H01Q 9/04* (2006.01)
(Continued)

(52) U.S. Cl.
CPC ......... *H01Q 13/106* (2013.01); *H01Q 9/0407* (2013.01); *H01Q 21/0006* (2013.01); *H01Q 21/065* (2013.01)

(58) Field of Classification Search
CPC .. H01Q 13/106; H01Q 9/0407; H01Q 9/0442; H01Q 21/064; H01Q 21/065;
(Continued)

(56) References Cited

U.S. PATENT DOCUMENTS 6,043,790 A * 3/2000 Derneryd ................. H01Q 3/26
342/368
6,556,809 B1 4/2003 Gross et al.
(Continued)

FOREIGN PATENT DOCUMENTS

WO 2018049257 A1 3/2018

OTHER PUBLICATIONS

Extended European Search Report on the Patentability of Application No. 19810533.0-1205/3804177 dated Feb. 11, 2022, 11 pages.

*Primary Examiner* — Thai Pham
(74) *Attorney, Agent, or Firm* — Womble Bond Dickinson (US) LLP

(57) ABSTRACT

A method and apparatus for testing an antenna are described. In on embodiment, the antenna comprises: a memory; an antenna aperture with a plurality of electronically controlled radio frequency (RF) radiating antenna elements; a pattern generator, including one or more processors, to generate a plurality of patterns to apply to the antenna aperture during testing to cause the antenna to generate a beam in response to each pattern of the plurality of patterns while pointing at a satellite; a receiver to receive satellite signals from the satellite in response to generating beams with the aperture; a metric provider, including one or more processors, to generate one or more satellite signal metrics for the received satellite signals; and antenna parameter selector to select one or more parameters associated with beamforming based on the satellite signal metrics indicating antenna performance reached a predetermined level, wherein selection of the one or more parameters is for storage in the memory and used to generate a beam with the antenna aperture when performing data communication.

26 Claims, 18 Drawing Sheets

Related U.S. Application Data

(60) Provisional application No. 62/747,040, filed on Oct. 17, 2018, provisional application No. 62/678,829, filed on May 31, 2018.

(51) Int. Cl.
*H04B 7/185* (2006.01)
*H04B 17/18* (2015.01)
*H01Q 21/06* (2006.01)
*H01Q 21/00* (2006.01)

(58) Field of Classification Search
CPC .............. H01Q 21/0006; H04B 7/0413; H04B 7/0617; H04B 7/18; H04B 7/185; H04B 7/18513; H04B 17/318
See application file for complete search history.

(56) References Cited

U.S. PATENT DOCUMENTS

| | | | |
|---|---|---|---|
| 7,633,442 B2 * | 12/2009 | Chiang | H04B 7/18517 342/432 |
| 2008/0258986 A1 * | 10/2008 | Milbrandt | H01Q 3/08 343/757 |
| 2015/0236413 A1 * | 8/2015 | Turpin | H04B 7/2041 342/368 |
| 2015/0236779 A1 | 8/2015 | Jalali | |

* cited by examiner

Perform a testing process that includes generating a plurality of antenna wave patterns to apply to an antenna aperture during testing to cause the antenna to generate a beam in response to each pattern of the plurality of patterns while pointing at a satellite, receiving satellite signals from the satellite in response to generating beams with the aperture, generating one or more satellite signal metrics for the received satellites signals, and selecting one or more parameters associated with beamforming based on the satellite signal metrics indicating antenna performance reached a predetermined level
201

Generate a beam with the antenna aperture when performing data communication with the satellite during normal operation
202

FIG. 2

```
┌─────────────────────────────────────────────────────────────────────────┐
│ Generate a plurality of patterns to apply to the antenna aperture during testing to cause the │
│ antenna to generate a beam in response to each pattern of the plurality of patterns while     │
│                              pointing at a satellite                                           │
│                                        391                                                     │
└─────────────────────────────────────────────────────────────────────────┘
                                          │
                                          ▼
┌─────────────────────────────────────────────────────────────────────────┐
│         Generate one or more satellite signal metrics based on received satellite signals      │
│                                        392                                                     │
└─────────────────────────────────────────────────────────────────────────┘
                                          │
                                          ▼
┌─────────────────────────────────────────────────────────────────────────┐
│      Select one or more parameters associated with beamforming based on satellite signal       │
│  metrics indicating antenna performance reached a predetermined level (e.g., the selected      │
│                            parameters are stored in the memory)                                │
│                                        393                                                     │
└─────────────────────────────────────────────────────────────────────────┘
                                          │
                                          ▼
┌─────────────────────────────────────────────────────────────────────────┐
│    Access the stored parameters and generating a beam with the antenna aperture when           │
│                              performing data communication                                     │
│                                        394                                                     │
└─────────────────────────────────────────────────────────────────────────┘
```

FIG. 3C

```
Pseudo Code

StartFreqMHz = 11750
SpanMHz = 200
SampleMHz = 5

While SpanMHz >= 0

SpanMHz = SpanMHz – SampleMHz

Set in RX Frequency in ASM : StartFreqMHz + SpanMHz

Collect PL ExNO and R EsNO

Set in RX Frequency in ASM : StartFreqMHz – SpanMHz

Collect = PL EsNO and R EsNO

SpanMHz = SpanMHz – SampleMHz

If SpanMHz == 0 you are complete, otherwise continue
```

ANTENNA TESTING

PRIORITY

The present patent application is a continuation of and claims benefit of U.S. patent application Ser. No. 16/425,645, filed on May 29, 2019 and entitled "Antenna Testing", claims priority to and incorporates by reference corresponding U.S. provisional patent application Ser. No. 62/678,829, titled, "ANTENNA SELF OPTIMIZATION," filed on May 31, 2018, and U.S. provisional patent application Ser. No. 62/747,040, titled, "VERIFYING TUNABLE BANDWIDTH," filed on Oct. 17, 2018.

FIELD OF THE INVENTION

Embodiments of the present invention relate to the field of wireless communication; more specifically, embodiments of the present invention relate to testing satellite antennas in the field.

BACKGROUND OF THE INVENTION

Prior to deploying flat-panel satellite antennas in the field for use, the antennas are often tested in a testing environment. The testing environment usually includes a chamber with specialized radio-frequency (RF) test equipment. The antenna is placed in the chamber and then subjected to a number of tests using external software that is not running on the antenna. The testing enables one or more antenna parameters to be properly set up prior to its deployment. In the prior art, full parameter optimization is performed for each antenna that comes out of manufacturing. The use of such a chamber and specialized equipment is very costly and adds to the overall cost of the antenna.

Furthermore, some antennas may degrade in performance over time and require retesting and one or more antenna parameters to be reset. If this is necessary, an individual may have to go into the field to the location of the antenna and try to retest the antenna and/or reset the parameters. This is very inconvenient and relies heavily on a large number of technicians that would need to be employed. However, the alternative solution if the antenna is already being used in the field is to have the antenna brought back from the field and retested in the testing chamber, which is very inconvenient as well. It is desirable to avoid the costs and inconvenience in the current antenna testing that is performed.

SUMMARY OF THE INVENTION

A method and apparatus for testing an antenna are described. In on embodiment, the antenna comprises: a memory; an antenna aperture with a plurality of electronically controlled radio frequency (RF) radiating antenna elements; a pattern generator, including one or more processors, to generate a plurality of patterns to apply to the antenna aperture during testing to cause the antenna to generate a beam in response to each pattern of the plurality of patterns while pointing at a satellite; a receiver to receive satellite signals from the satellite in response to generating beams with the aperture; a metric provider, including one or more processors, to generate one or more satellite signal metrics for the received satellite signals; and antenna parameter selector to select one or more parameters associated with beamforming based on the satellite signal metrics indicating antenna performance reached a predetermined level, wherein selection of the one or more parameters is for storage in the memory and used to generate a beam with the antenna aperture when performing data communication.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 2 is a flow diagram of one embodiment of a process for using an antenna aperture.

FIG. 3C is a flow diagram of one embodiment of a self-optimization process.

FIG. 5C illustrates an example of pseudo code for performing tunable bandwidth verification.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Embodiments of the invention include a process for testing antenna performance using measured signal characteristics from a satellite beam. In one embodiment, the antenna is an electronically steered flat panel antenna with radio-frequency (RF) radiating antenna elements. In one embodiment, the RF radiating antenna elements comprise surface scattering metamaterial antenna elements. In one embodiment, the antenna is a portable antenna that may be attached to or otherwise coupled to a moving object (e.g., vessel, vehicle, etc.). Examples of such antennas are described in more detail below.

In one embodiment, the techniques disclosed herein for testing antenna performance are used as part of one or more processes that are performed on the antenna. In one embodiment, these processes are performed out in the field without the need for a testing chamber. In one embodiment, one of the processes is a self-optimization process that is performed by the antenna to optimize itself. In another embodiment, one of the processes is for verifying the tunable bandwidth of the antenna.

Figure 1:
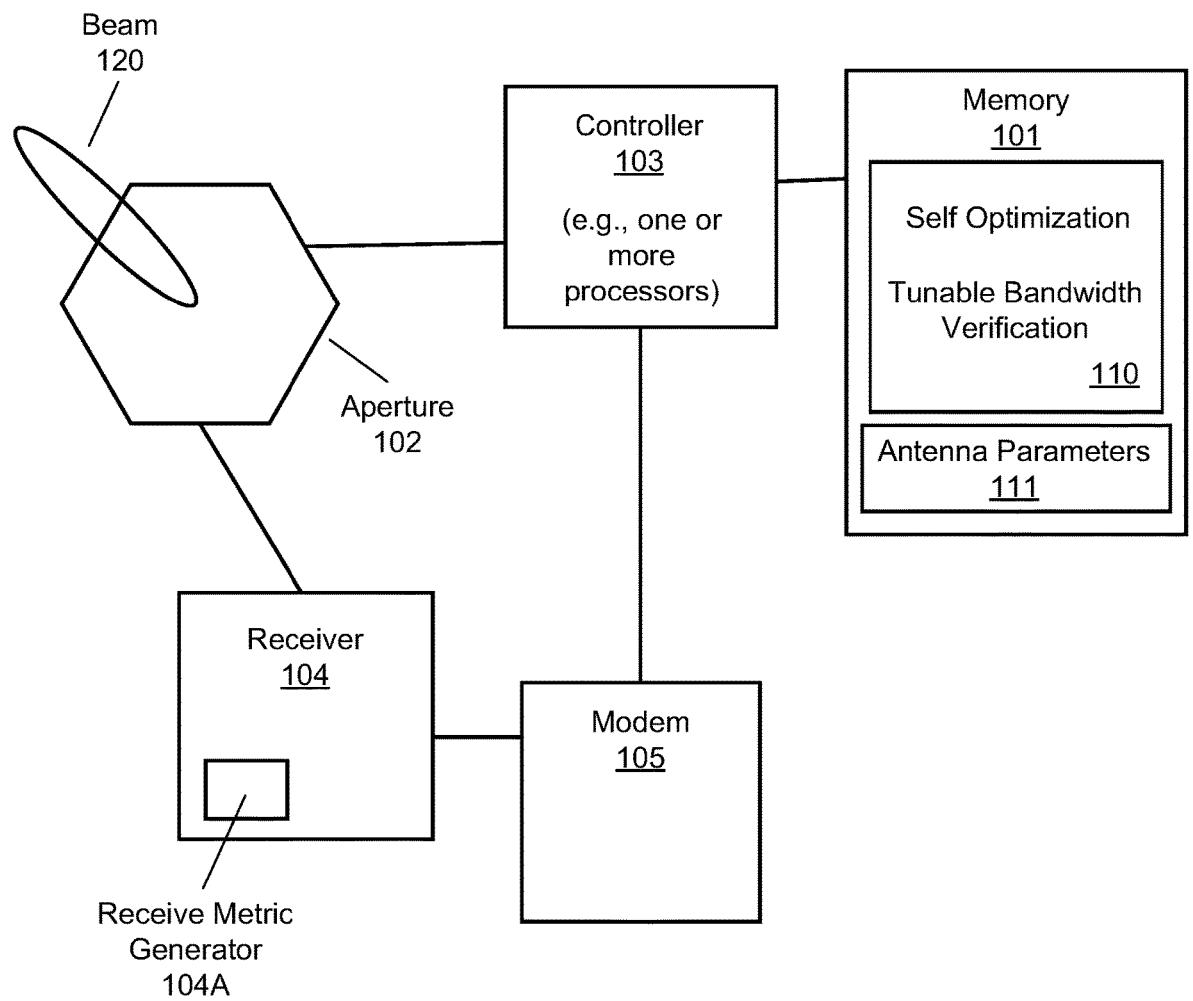
FIG. 1 is a block diagram of an apparatus for testing an antenna (e.g., an electronically steered portable flat-panel antenna).

FIG. 1 is a block diagram of an apparatus for testing an antenna (e.g., an electronically steered portable flat-panel antenna). Referring to FIG. 1, the antenna includes memory 101 that stores testing modules 110 (e.g., a self-optimization module, tunable bandwidth verification module, etc.) and antenna parameters 111, an antenna aperture 102 with a plurality of electronically controlled radio frequency (RF) radiating antenna elements (e.g., metamaterial antenna elements, etc.), a controller 103 coupled to antenna aperture 102 and memory 101, a receiver 104 coupled to antenna aperture 102 (and potentially coupled directly to controller 103), and a modem 105 coupled to receiver 1045 and controller 103. In one embodiment, antenna aperture 102 is part of an antenna subsystem module (ASM).

In one embodiment, controller 103 comprises one or more processors and is operable to control the operations of the antenna. In one embodiment, controller 103 operates as a pattern generator to generate a plurality of electronically steered antenna patterns to apply to antenna aperture 102 during testing to cause antenna aperture 102 to generate a beam (e.g., beam 120) in response to each pattern of the plurality of patterns while pointing at a satellite.

In one embodiment, each of the plurality of a patterns are generated based on beamforming parameters optimized for gain at the operating frequency using satellite signal feedback metrics. In one embodiment, at least one of the beamforming parameters for one or more patterns is selected using a genetic algorithm.

Receiver 104 receives satellite signals from the satellite in response to the beams generated with the aperture. In one embodiment, receiver 104 is part of tracking receiver hardware of the antenna. In another embodiment, receiver 104 is part of a tracking receiver on a hub side of a satellite. In one embodiment, receiver 104 includes a signal metric provider 104A that generates one or more satellite signal metrics (e.g., gain metrics, signal-to-noise ratio (SNR) metrics, fitness metrics) for the received satellite signals. In one embodiment, these metrics are generated during testing. In one embodiment, the satellite signal metrics include an indication of each pattern's performance. In one embodiment, the indication of pattern performance comprises a gain value (e.g., an automatic gain control (AGC) value).

Receiver 104 provides the received signals and the signal metrics to modem 105. The signal metrics may be provided to controller 103, via modem 105 or directly from receiver 104. In one embodiment, receiver 104 is a tracking receiver that is part of the ASM that includes signal metric provider 104A.

In one embodiment, generation of the plurality of patterns and satellite signal metrics are part of a self-optimization process performed on the antenna. In one embodiment, this self-optimization process is performed while the antenna is not being moved and tracking on the antenna is turned off. In one embodiment, incoming commands to the antenna are not performed while performing the self-optimization process.

In another embodiment, generation of the plurality of patterns and satellite signal metrics are part of a process for verifying tunable bandwidth of the antenna.

In one embodiment, controller 103, using one or more processors, operates as an antenna parameter selector to select one or more parameters associated with beamforming based on the satellite signal metrics from signal metric provider 104A. In one embodiment, the antenna parameter selector selects the parameters when the antenna performance has reached a predetermined level. For example, if performing self-optimization, the antenna parameter selector may select the beamforming parameters that ensure proper beamforming for a particular operating frequency of the antenna. Thus, in one embodiment, the antenna performance is for an operating frequency of the antenna. The one or more parameters that are selected are stored in the memory, such as, for example, but not limited to, memory 101, and are then used when generating a beam with antenna aperture 102 when performing data communication with a satellite during normal operation.

FIG. 2 is a flow diagram of one embodiment of a process for an antenna aperture. In one embodiment, the process is performed by processing logic that may comprise hardware (circuitry, dedicated logic, etc.), software (e.g., software running on a chip), firmware, or a combination of the three.

Referring to FIG. 2, the process begins by performing a testing process that includes generating a plurality of electronically steered antenna patterns to apply to an antenna aperture during testing to cause the antenna to generate a beam in response to each of the patterns while pointing at a satellite, receiving satellite signals from the satellite in response to generating beams with the aperture, generating one or more satellite signal metrics for the received satellite signals, and selecting one or more parameters associated with beamforming based on the satellite signal metrics indicating antenna performance reached a predetermined level (processing block 201).

After the testing process, processing logic generates a beam with the antenna aperture when performing data communication with the satellite during normal operation (processing block 202). That is, after testing has been completed, the parameters that have been selected as a result of testing are used for the antenna during its normal satellite communications.

The use of the architecture and method described above may be used for a number of applications with an antenna. Two of those applications, antenna self-optimization and tunable bandwidth verification, are described in more detail below.

Antenna Self-Optimization

Embodiments of the invention include a process for optimizing antenna performance using measured signal characteristics from a satellite beam. In one embodiment, the antenna is a flat panel antenna with surface scattering metamaterial antenna elements. Examples of such antennas are described in more detail below. In one embodiment, the process for optimizing antenna performance eliminates the need for specialized equipment, signals, or setup to perform antenna optimization. In one embodiment, the antenna can complete the optimization itself.

In one embodiment, the self-optimization process is started manually during normal operation only if the antenna is stationary. In this case, incoming commands to the antenna are blocked to prevent the beam from moving during optimization. In one embodiment, the optimization can be run at any time during normal operation of the antenna. In other words, the antenna does not have to be stopped from normal operation in order to undergo the optimization process. Furthermore, in one embodiment, the process described herein provides the ability to optimize antenna performance during antenna commissioning to reduce manufacturing calibration time for each individual ASM.

In one embodiment, antenna performance is improved, and potentially optimized, in the field to achieve peak performance at various operating frequencies, environmental conditions, or to compensate for performance degradation that may occur over time. That is, the optimization process provides a user or integrator the ability to improve, and potentially optimize, antenna performance in the field under various operating frequencies and conditions that may not be provided by factory calibration parameters.

In one embodiment, optimization software executed by a controller on the antenna utilizes an algorithm to determine antenna parameters that are optimized for gain at a given operating frequency. Other features for which parameters may be optimized include side lobe levels, beam width, cross-polarization discrimination, instantaneous bandwidth and total data throughput.

These antenna parameters are determined based on a fitness metric that is input into the optimization algorithm. In one embodiment, the fitness metric comprises satellite signal feedback metrics that are read from tracking receiver hardware on the antenna.

In one embodiment, these features are different than optimizations performed on prior art antennas that required an RF chamber and specialized equipment. Embodiments of the antenna self-optimization described herein are a step towards reducing manufacturing costs and enabling a customer or integrator to optimize antenna performance in the field. The antenna self-optimization techniques described herein provide the ability to optimize antenna parameters with a standard customer antenna deployment. In one embodiment, the antenna deployment includes self-optimization software running on the antenna.

The following operations outline the use and operation of one embodiment of an antenna self-optimization process:

1. When optimization is triggered, a metrics thread is started to continuously read signal metrics from the tracking receiver hardware on the ASM. In one embodiment, the metrics thread is executed on a controller (e.g., processor) of the antenna.
2. While the optimization process is being performed, in one embodiment, a pattern generation service command handler rejects all incoming commands except for optimization status requests to ensure that the satellite continues pointing at the target satellite for the duration of the optimization process.
3. The optimization process generates an initial antenna parameter set population, and then it generates new populations based on the fitness scores for each individual parameter set. In one embodiment, the new populations are generated using a genetic algorithm. Note that other search algorithms could be used to generate new antenna parameter set populations.
4. Fitness scores are determined for each parameter set by calculating and applying an antenna beam pattern using these individual parameters and then reading the fitness measure (e.g., an AGC metric value) from a metrics thread.
5. In one embodiment, when a configured convergence threshold is exceeded, or a configured maximum number of generations is reached, the self-optimization process halts and the parameter set with the best score from all previous generations is applied to the antenna.
6. Satellite signal metrics are sampled before and after the self-optimization process is performed to determine if the new optimized parameters should be persisted in the antenna configuration. If performance has improved, then the antenna parameters are stored and utilized by the antenna for the current operating frequency of the satellite.

Figure 3A:
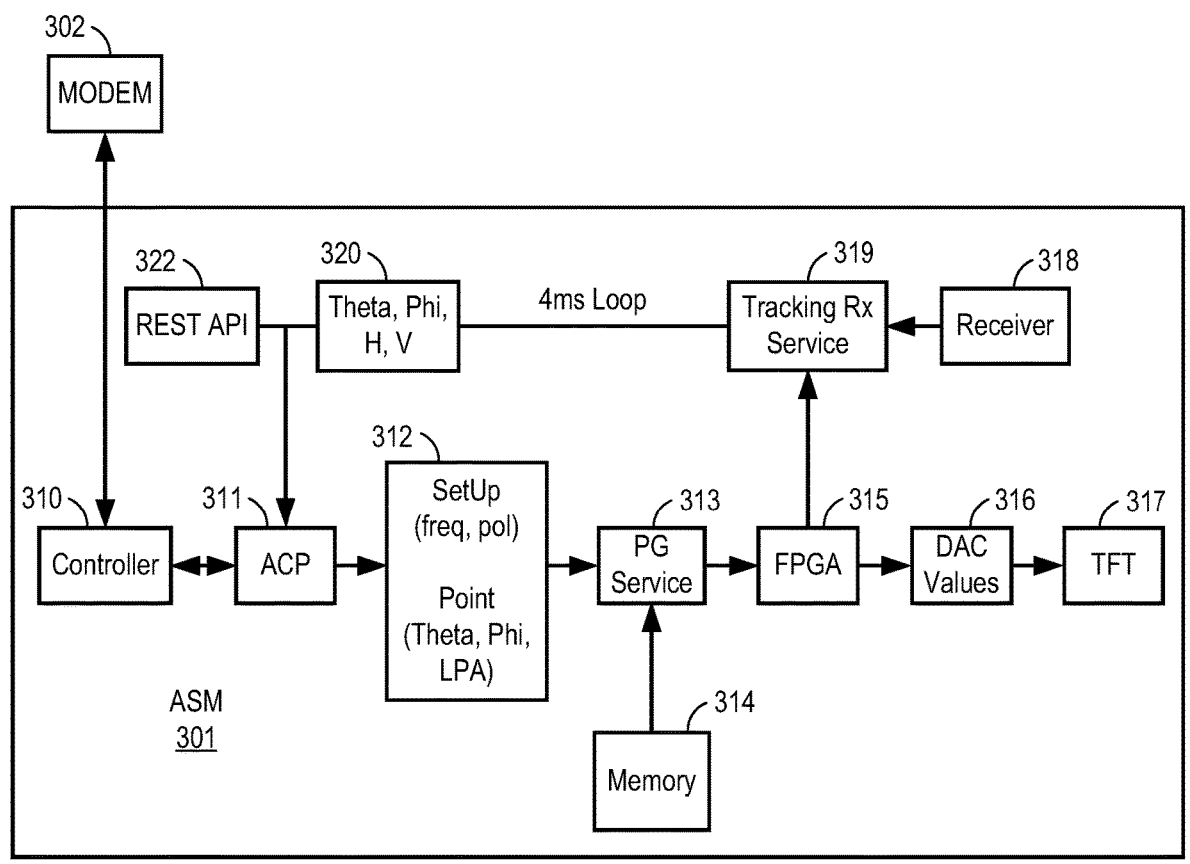
FIG. 3A is a block diagram of one embodiment of a portion of an antenna that performs a self-optimization process.

FIG. 3A is a block diagram of one embodiment of a portion of an antenna that performs a self-optimization process. Referring to FIG. 3A, the antenna includes an ASM 301, which includes an antenna aperture (not shown), and a modem 302. In one embodiment, the antenna aperture is antenna aperture 102 of FIG. 1 and modem 302 is modem 105 of FIG. 1.

Modem 302 exchanges communications with ASM 301 through controller 310. Controller 310 comprises one or more processors and uses OpenAMIP, which is an IP based protocol that facilitates the exchange of information between an antenna controller unit, such as ASM 301, and a satellite. Note that other protocols and communication exchange mechanisms may be used instead of OpenAMIP.

A self-optimization API is also executed using one or more processors on ASM 301. The self-optimization API controls execution of the self-optimization process on ASM 301.

REST API 322 is the customer-facing API for communicating with the ASM. In one embodiment, Self-optimization is controlled with a start or stop command via REST API 322. Typically, a customer would control self-optimization using the web interface which utilizes the REST API, but the pattern generation service may be accessed directly to control self-optimization.

During normal operation, controller 310 sends commands to antenna control process (ACP) module 311 to start tracking a target satellite, and then ACP module 311 sends setup information and continuously calculates and sends pointing vectors to pattern generation service 313 (described in more detail below). For the self-optimization process, controller 310 controls the ACP module 311 and the most recent pointing vectors that were last sent by ACP module 311 are used. In one embodiment, ACP module 311 sends setup and pointing information 312 comprised of operating frequency (freq) and polarization (pol) values for the antenna aperture as setup information and a pointing vector having theta, phi and linear polarization angle (LPA) values as the pointing information to a pattern generation service 313. In one embodiment, ACP module 311 is implemented in software that is executed by one or more processors of ASM 301. Alternatively, ACP module 311 is implemented as hardware on the ASM.

In response to the setup and pointing information 312 and inputs from memory 314 (e.g., stored parameters from the last time optimization was performed, non-optimized default values), pattern generation service 313 generates a plurality of electronically steered antenna patterns that control antenna elements (e.g., RF radiating antenna elements (e.g., metamaterial scattering antenna elements)) of the antenna aperture to form receive beams as part of the receive self-optimization process. For the self-optimization process, a population of patterns are generated and used to generate various beams. In one embodiment, the patterns are randomly selected based on the operating frequency of the antenna. In another embodiment, the patterns are selected using a genetic algorithm (or other search algorithm). In yet another embodiment, the first pattern or initial set of patterns is selected randomly and subsequent patterns are selected using a genetic algorithm (or other search algorithm). In one embodiment, pattern generation service 313 comprises a software service that is executed by one or more processors on ASM 301. In another embodiment, pattern generation service 313 comprises hardware on ASM 301.

Pattern generation service 313 loads parameters and data tables into FPGA 315. In response to the parameters and data tables, FPGA 315 generates the pattern and outputs it to the antenna elements in the form of digital-to-analog (DAC) values 316 (for each pattern). More specifically, a DAC value for each element in the antenna array is calculated by FPGA 315 using the beamforming parameters and data tables provided by pattern generation service 313. FPGA 315 then outputs control signals to the antenna elements to drive the calculated pattern. DAC values 316 control thin film transistors (TFTs) 317 in order to control the antenna elements of the antenna aperture (not shown) to generate a beam. Examples of TFT and their control are described in more detail below.

After each beam has been formed in response to a pattern generated by pattern generation service 313, receiver 318 receives a signal back from the satellite and is processed by a tracking receiver service 319. Tracking receiver service 319 sends one or more fitness metric values 320 to the self-optimization API (as the pointing angles are already known by pattern generation service 313). The fitness metric values are indicative of the antenna's performance for the beam pattern for the particular operating frequency in which the antenna is set to operate. In one embodiment, the fitness measure is a gain value (e.g., AGC value) associated with the receive signal (for the operating frequency). Tracking Rx service 319 determines and sends the AGC value to the self-optimization API. More specifically, in one embodiment, tracking receiver service 319 sends several signal metrics including the AGC value which the self-optimization API uses as a fitness metric. FPGA 315 triggers an interrupt at a 4 ms rate to signal tracking receiver service 319 to send new tracking metrics to its subscribers. In another embodiment, another metric may be used instead of the gain value, such as, for example, but not limited to, SNR. In one embodiment, tracking receiver service 319 comprises a software service that is executed by one or more processors on ASM 301. In another embodiment, tracking receiver service 319 comprises hardware on ASM 301.

In response to the values received from tracking receiver service 319, self-optimization API 322 compares the receive metrics (e.g., gain values) for different patterns to determine if the pattern performed better than a previously used pattern that was tested during the self-optimization process. If so, self-optimization API 322 saves the parameters associated with that pattern. In one embodiment, after receiving receive metrics (e.g., gain values) for all patterns in the population used during the testing and identifying the pattern that performed the best (e.g., best receive metric (e.g., best AGC value) among the population), self-optimization API 322 compares the receive metrics of the best performing pattern with the receive metrics associated with the pattern used before optimization to determine which is better. Based on the comparison, self-optimization API 322 saves the new parameters associated with the best performing pattern from the self-optimization process or retains the parameters of the pattern used before self-optimization. In other words, if the self-optimization process does not produce a better beam, the antenna parameter values already used to create the beam by the antenna prior to the self-optimization process are not changed.

Figure 3B:
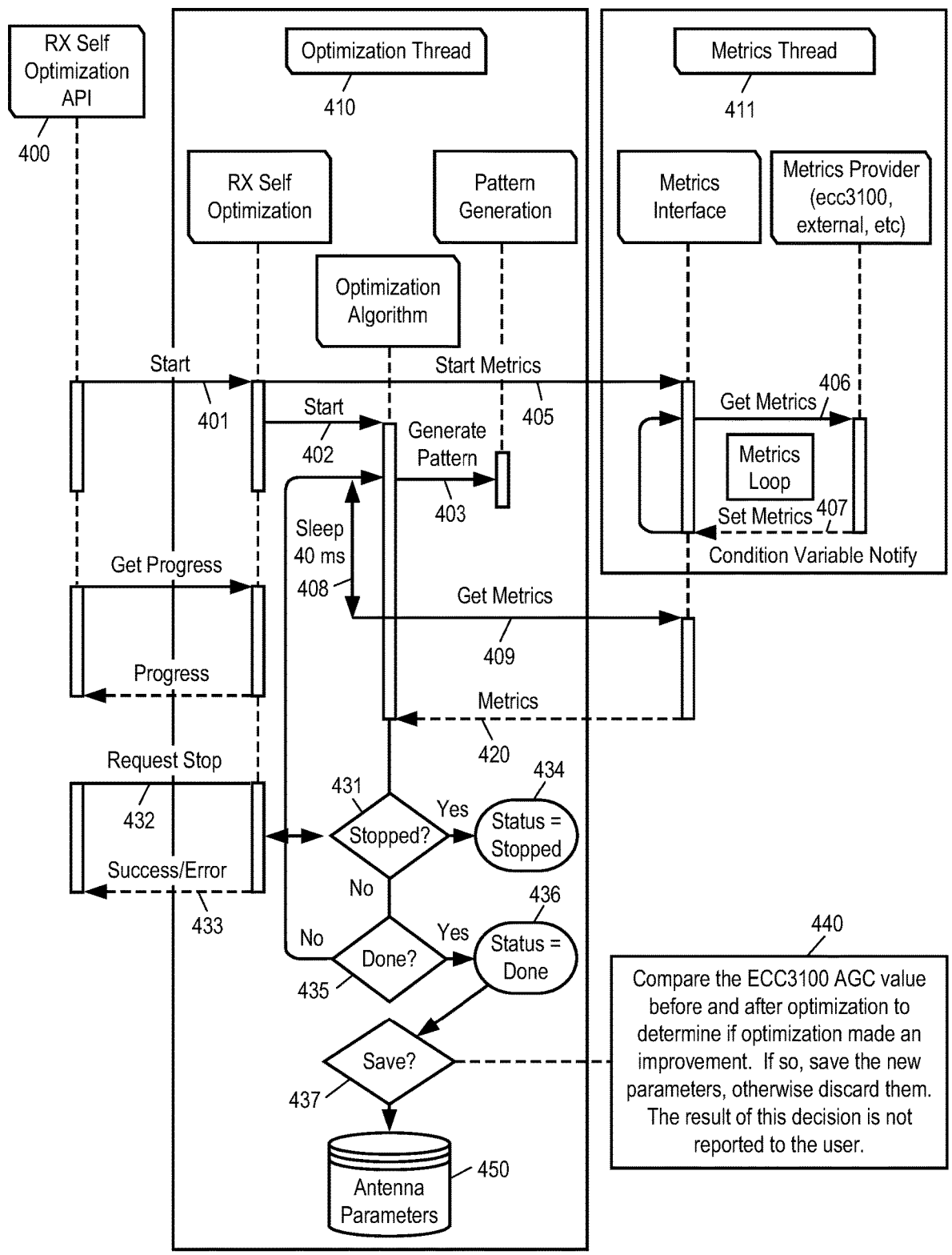
FIG. 3B is a flow diagram of one embodiment of a self-optimization process.

FIG. 3B is a flow diagram of one embodiment of a self-optimization process. In one embodiment, the process is performed by processing logic that may comprise hardware (circuitry, dedicated logic, etc.), software (e.g., software running on a chip), firmware, or a combination of the three. In one embodiment, the process is performed using the antenna set forth in FIGS. 1 and 3A.

Referring to FIG. 3B, receive (Rx) self-optimization API 400 issues a start command 401 to optimization thread 410. In response to start command 401, optimization thread 410 issues start command 402 to cause patterns to be generated 403 and issues start metrics command 405. Start metrics command 405 causes a get metrics 406 and set metrics 407 command loop to be started by a metrics thread 411 to collect receive metrics (e.g., AGC value, etc.) associated with the antenna performance, and more particularly the receive beam performance, for each of the electronically steered antenna patterns that are generated during the self-optimization process. In one embodiment, the metrics loop compares the receive metrics for each beam that is generated in response to a pattern generated with the receive metrics of the pattern associated with the best performing beam (e.g., highest AGC) that has occurred so far during the self-optimization processes. If the receive metrics indicates that the current beam performance is better than the best of the previous beam performance, then the antenna parameters associated with that antenna wave pattern are saved along with the receive metrics (e.g., AGC value) of the beam. In one embodiment, the receive metrics value (e.g., AGC value) is obtained from a tracking receiver on the ASM in conjunction with a tracking receiver service. In one embodiment, the loop is a 4 ms loop.

After a time delay 408 (e.g., 40 ms delay), optimization thread 410 issues a get metrics command 409 and receives the receive metrics 420. In one embodiment, receive metrics 420 includes the antenna parameters of the pattern that produced the best receive metrics value along with the actual receive metrics value (e.g., AGC value) from the patterns generated during the self-optimization process.

After receiving receive metrics 420, the process transitions to processing block 431 where processing logic of optimization thread 410 determines whether the self-optimization process has been stopped (431). This may be in response to a request stop command 432, in which case the status of the self-optimization process is set to a stopped status (434). If the self-optimization process hasn't stopped, the process transitions to processing block 435 where processing logic tests whether the self-optimization process has completed. If so, the status is set to done (436). If not, the process transitions to processing block 403 where additional patterns are generated and the process repeats from that point.

If the self-optimization process has completed, its status is set to done (436) and the process transitions to processing block 437 where processing logic determines whether the antenna parameters associated with the best performing pattern from the self-optimization process should be stored in the antenna parameters storage 450. In one embodiment, at processing block 440, processing logic compares the receive metrics value (e.g., AGC value, etc.) for the pattern that was used before the self-optimization process with the one associated with the best performing beam, and its associated pattern, during the self-optimization process to determine if an improvement was made, and if so, then the antenna parameters associated with the pattern that produced the best beam performance during self-optimization are stored in antenna parameter storage 450. If not, the antenna parameters from the pattern used prior to the self-optimization process are retained in antenna parameter storage 450. The parameters could vary depending on the pattern generation algorithm that is being used. In one embodiment, the parameters stored after self-optimization are related to a holographic wave equation and a Euclidean modulation scheme. In one embodiment, the parameters are for one embodiment of a Euclidean modulation scheme that uses the set of available polarizabilities to approximate the set of required polarizabilities by minimizing the Euclidean distance between the two (e.g., minimizing the Euclidean norm between the desired and available polarizabilities as a way of locally minimizing the error between the required polarizability and the actual polarizability delivered by the dipole). More specifically, in one embodiment, the parameters are Euclidean modulation scheme parameters for setting scattered phase and amplitude for each of the antenna elements (e.g., resonators) in the antenna aperture in order to facilitate the mapping of an ideal, or desired, modulation state to achievable or allowable modulation states where the modulation values of the allowable modulation states are mapped to the parameter. For more information on one embodiment of a Euclidean modulation scheme for an electronically steered flat-panel antenna, see U.S. Ser. No. 15/881,440, entitled RESTRICTED EUCLIDEAN MODULATION, filed Jan. 26, 2018, incorporated herein by reference.

FIG. 3C illustrates some embodiments of a self-optimization process. Referring to FIG. 3C, the process includes generating a plurality of patterns to apply to the antenna aperture during testing to cause the antenna to generate a beam in response to each pattern of the plurality of patterns while pointing at a satellite (block 391) and generating one or more satellite signal metrics based on received satellite signals (block 392). The process also includes selecting one or more parameters associated with beamforming based on satellite signal metrics indicating antenna performance reached a predetermined level (block 393). In some embodiments, the selected parameters are stored in the memory. The process further includes accessing the stored parameters and generating a beam with the antenna aperture when performing data communication (block 394).

Note that the process and described herein for use in self-optimization could be used in the manufacturing optimization process to perform chamber optimization at a wider range of frequencies.

Tunable Bandwidth Verification

The testing process described above may be used for verifying tunable bandwidth of an electronically steered antenna over a satellite network. In such an application, there are a number of innovations associated with the embodiments described herein. For example, one or more embodiments of the invention include one or more of the following:

verifying tunable bandwidth of electronically steered antenna without using a chamber;
checking the state of health of an electronically steered antenna to determine if the antenna operating at a particular area of frequency doesn't meet a testing specification, (which may be used to subsequently optimize the antenna for that frequency); and
verifying tunable bandwidth of electronically steered antenna outdoors.

Note that these innovations are important in view of that fact that existing solution require an anechoic chamber and can require a lot of time to perform.

Figure 4:
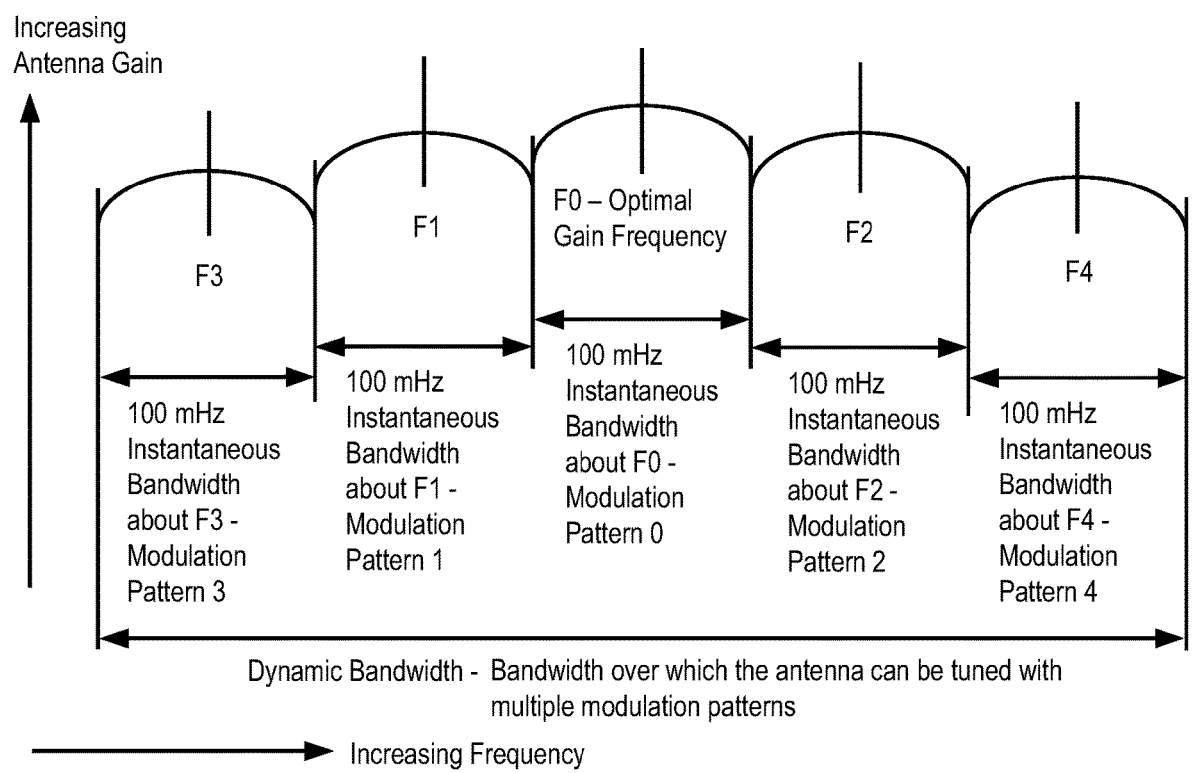
FIG. 4 illustrates an example of bandwidth over which an antenna can be turned with multiple modulation patterns.

For purposes herein, the term "tunable bandwidth" refers to the total frequency bandwidth over which the antenna can operate using multiple electronically steered antenna patterns (equation parameters). Multiple wave patterns allow the antenna performance to be tuned to different frequencies. Therefore, for each wave equation, a center frequency is defined with a bandwidth associated with that center frequency. This means that to cover the receiver and transmit frequency range, multiple unique wave equations are required. Pictorially, this is illustrated in FIG. 4, where each wave equation tunes the radio-frequency (RF) response around the modulation frequencies, $F_0$ to $F_5$ (where $F_0$ is the optimal gain frequency), and all performance requirements are met across the entire bandwidth. In this case, each of the modulation frequencies covers a frequency of 100 MHz, with the entire bandwidth being 500 MHz.

Visualization of Instantaneous and Tunable Bandwidths

There is a challenge to verifying various radio frequency performance of an electronically steered antenna for tunable bandwidth. Currently, electronically steered antennas are being tested by going through an anechoic chamber for tunable bandwidth verification and not a real-world scenario.

In one embodiment, as part of a tunable bandwidth verification process, the antenna dynamically generates antenna patterns. To verify without an anechoic chamber, one can dynamically change the electronically steered antenna pattern while keeping in a static non-tracking configuration (e.g., tracking is disabled so that antenna acts as a parabolic). This allows a current signal-to-noise ratio (SNR) metric referred to as PL EsN0 (a signal metric indicating the quality of the signal) to be collected from the operating electronically steered antenna. Alternatively, gain could be used. In one embodiment, the collection is done by a receiver on the antenna (e.g., a tracking receiver on the ASM that contains the antenna aperture). Thus, the testing process is performed by the antenna acting as a receiver.

Note that for acceptance, testing tunable bandwidth is an interest to some customers. In one embodiment, to verify a typical configuration without a hertz chamber to collect data, the verification setup is configured to have the following: a starting PL Es/N0 that is within the minimal detectable signal (e.g., a signal greater than −3 dB) from an electronically steered antenna, is in an operational environment, and is in a static environment. With the antenna is this state, a verification of tunable bandwidth can be achieved. Because antennas are tested in the field, many antennas in the field could be tested at the same time. Furthermore, this testing could be part of the commissioning process.

In one embodiment, the structure of FIG. 3A is used to perform the tunable bandwidth verification process. In such a case, the modem 302 provides pointing data to the electronically steered antenna aperture, the pattern generation service 313 generates the requisite patterns for the various modulation frequencies to cover the entire bandwidth being verified, and the receiver (e.g., tracking receiver 318 and tracking receive service 319) of the ASM is able to receive signals and generate metrics for each of the modulation frequencies.

Figure 5A:
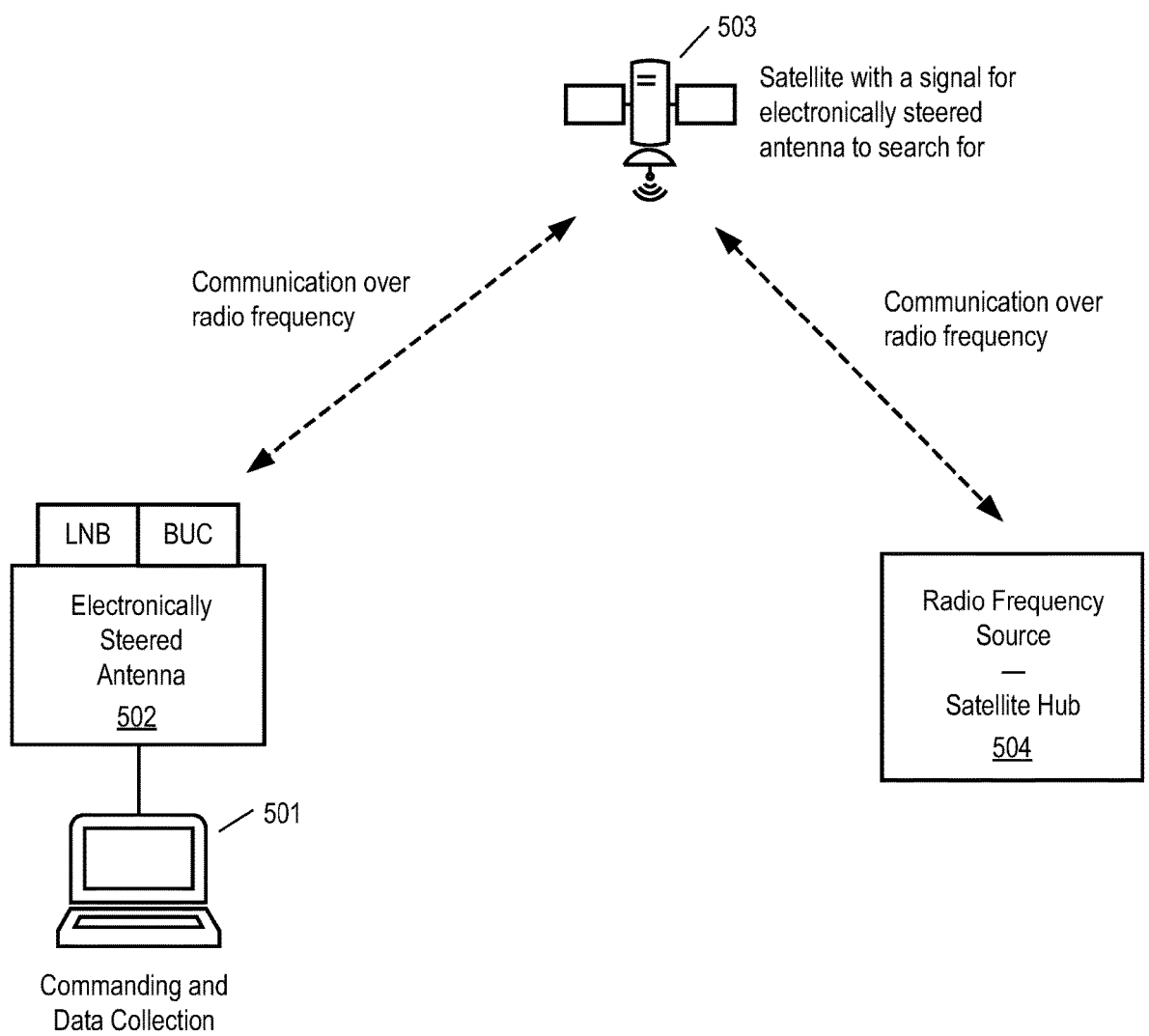
FIG. 5A is a block diagram of one embodiment of a structure to perform tunable bandwidth verification.

In another embodiment, the structure of FIG. 5A is used to perform the tunable bandwidth verification. Referring to FIG. 5A, a host computer system (e.g., personal computer, etc.) 501 configures electronically steered antenna 502, provides pointing data to electronically steered antenna 502, and commands the electronically steered antenna to generate a new antenna pattern for forming a beam directed at a target satellite (e.g., satellite 503). In response to the beam generated in response to the new antenna pattern, computer system 501 collects data in the form of signal metrics (e.g., PL EsN0 or other signal-to-noise ratio metrics, AGC, etc.) indicating performance of the beam for each of the modulation frequencies that cover the bandwidth. If the performance is above a predetermined level or threshold, then the bandwidth for that modulation frequency is considered verified. Alternatively, a modem of the antenna provides pointing data to electronically steered antenna 502. A direct current (DC) source for the low noise block downconverter (LNB) and the buck up converter (BUC) is also included. In one embodiment, hub 504 provides a signal to satellite 503 for which electronically steered antenna 502 can search. Note that other signal sources may be used.

In one embodiment, each time the electronically steered antenna is commanded to generate a new antenna pattern from the commanded frequency, the drop in gain within 100 MHz is less than a specified value. In one embodiment, this specified value is 1 dB, such that from center frequency it can only drop 1 dB from peak gain, and at most be 100 MHz wide. In alternative embodiments, values other than 100 MHz may be used. Similarly, in alternative embodiment, values other than 1 dB may be used. By keeping the electronically steered antenna receive demodulator onto the carrier and generating new antenna patterns, one can capture the receive signal metrics (e.g., PL EsN0) at any given moment and collect the receive signal metrics (e.g., PL EsN0) data.

Figure 5B:
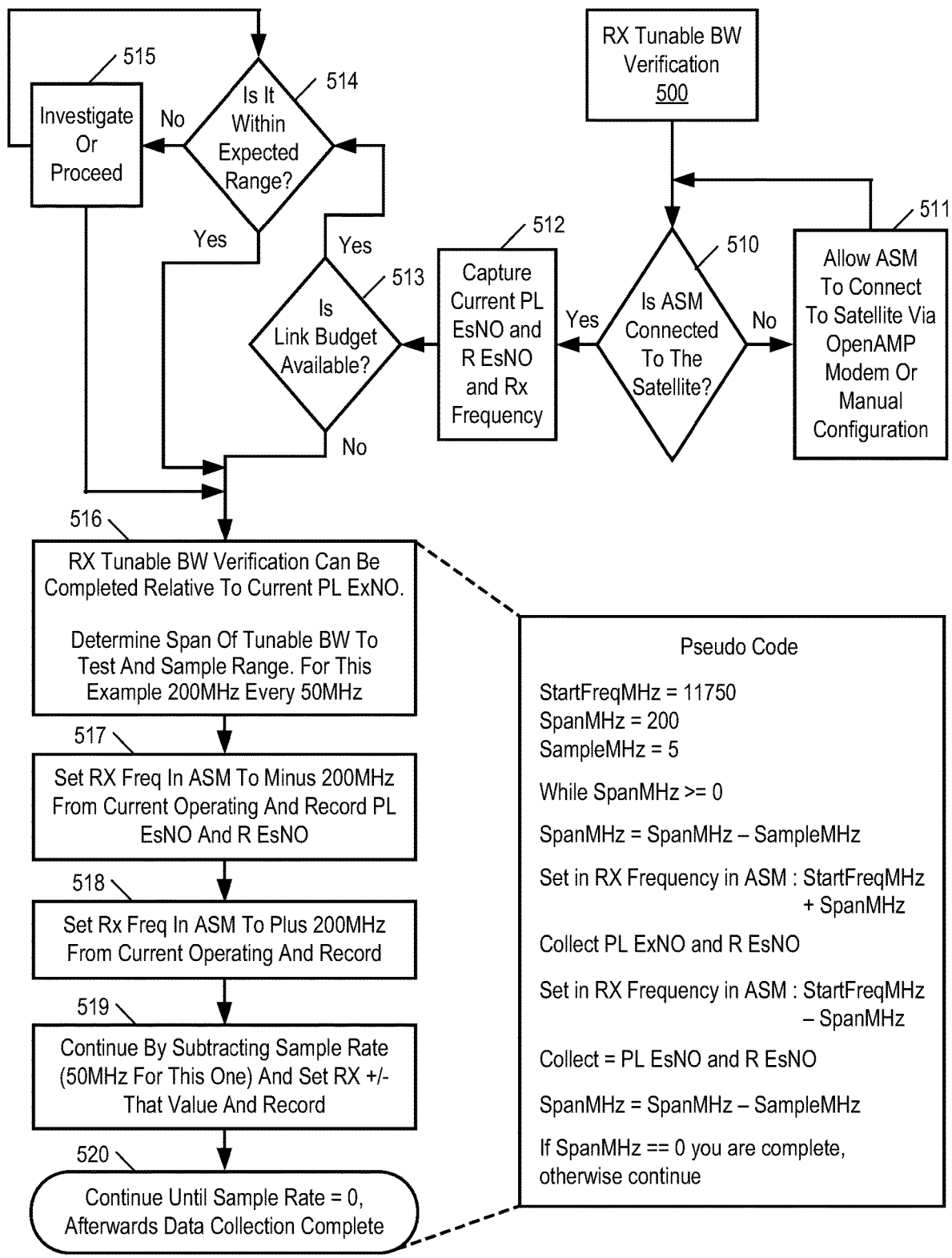
FIG. 5B is a flow diagram of one embodiment of a process for performing tunable bandwidth verification.

FIG. 5B is a flow diagram of one embodiment of a process for testing the tunable bandwidth. In one embodiment, the testing process is performed by processing logic that may comprise hardware (circuitry, dedicated logic, etc.), software (e.g., software running on a chip), firmware, or a combination of the three. FIG. 5C illustrates associated pseudo code for a portion of the process depicted in FIG. 5B.

Referring to FIG. 5B, the process beings with processing logic determining whether the ASM is connected to the satellite (processing block 510). If not, the process transitions to processing block 511 where processing logic allows the ASM to connect to the satellite and then the process transitions back to processing block 510. In one embodiment, the ASM is allowed to connect to the satellite via an OpenAMIP modem or via a manual configuration.

If the ASM is connected to the satellite, the process transitions to processing block 512 where processing logic captures the current PL EsN0, the R EsN0, and the receive (Rx) frequency.

Thereafter, processing logic tests whether there is link budget available (processing block 513). If so, the process transitions to processing block 514 where processing logic determines whether the link budget is in the expected bandwidth range. If not, the process transitions to processing block 515 where processing logic investigates whether it's in the expected or tolerable range, and either transitions back to processing block 514 or to processing block 516 depending on whether it needs to be redone or not, respectively. If the link budget is in the expected range or if there is no link budget available, the process transitions to processing block 516 where a user can compare relative PL EsN0 values during the process.

At processing block 516, the Rx tunable bandwidth (BW) verification process is performed relative to the current PL EsN0 and processing logic determines a span of tunable bandwidth to test and sample the range. In one embodiment, the span is set to 200 MHz using a sample range of 50 MHz. Note that other spans and ranges may be used.

Then, processing logic sets the receive frequency in the ASM to minus 200 MHz from the current operating frequency and records the PL EsN0 and R EsN0 (processing block 517) and sets the receive frequency in the ASM to plus 200 MHz from the current operating frequency and records the PL EsN0 (physical layer EsN0) and R EsN0 (radial EsN0) (processing block 518).

Next, processing logic subtracts the sample range (e.g., 50 MHz in one example) and uses that value as the new value in repeating processing blocks 517 and 518 (processing block 519).

Processing logic continues repeating processing blocks 517-519 until the sample range is 0. When this occurs, the data collection via the recording steps is completed.

Note that in alternative embodiments, the values of 200 MHz, which is based on the 100 MHz discussed above, may be changed to other values. Also, in alternative embodiments, the size of the steps may be other than 50 MHz.

Figure 5D:
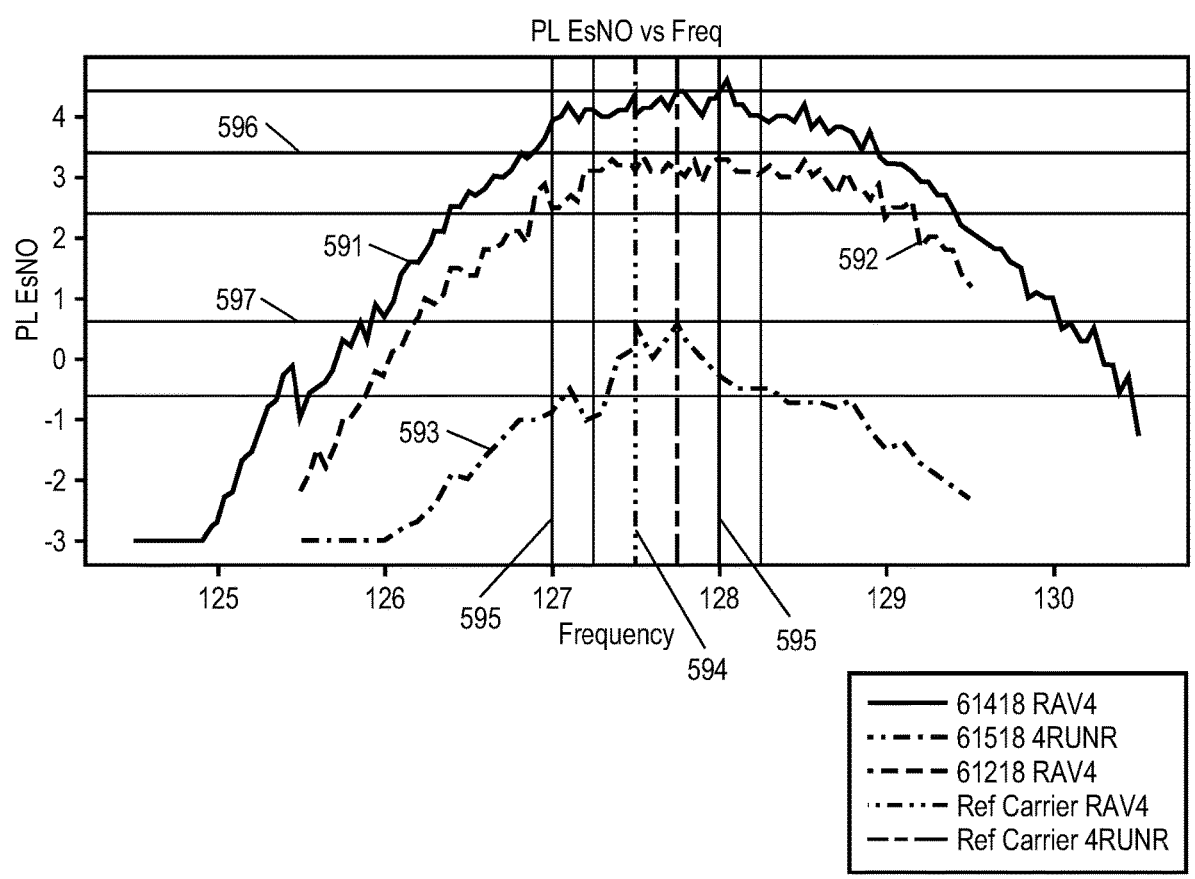
FIG. 5D illustrates a set of graphs of results from performing tunable bandwidth verification.

FIG. 5D illustrates results of using the process. In this sample, graph 591 (top) and graph 592 (middle) are for the same ASM but different days (graph 592 was during rain). The solid vertical line 594 (third from the left) is the forward (FWD) carrier (downstream carrier) center frequency of graph 591 (top) and graph 592 (middle) and dotted vertical lines 595 represent 100 Mhz. The horizontal dotted line 596 between graph 591 (top) and graph 592 (middle) is the "1 dB" margin.

Graph 593 (bottom) is for a different ASM, and the different FWD carrier center frequency is vertical line 597.

In one embodiment, the techniques described herein can be also used to verify scan loss of an electronically steered antenna as well.

Examples of Antenna Embodiments

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 6:
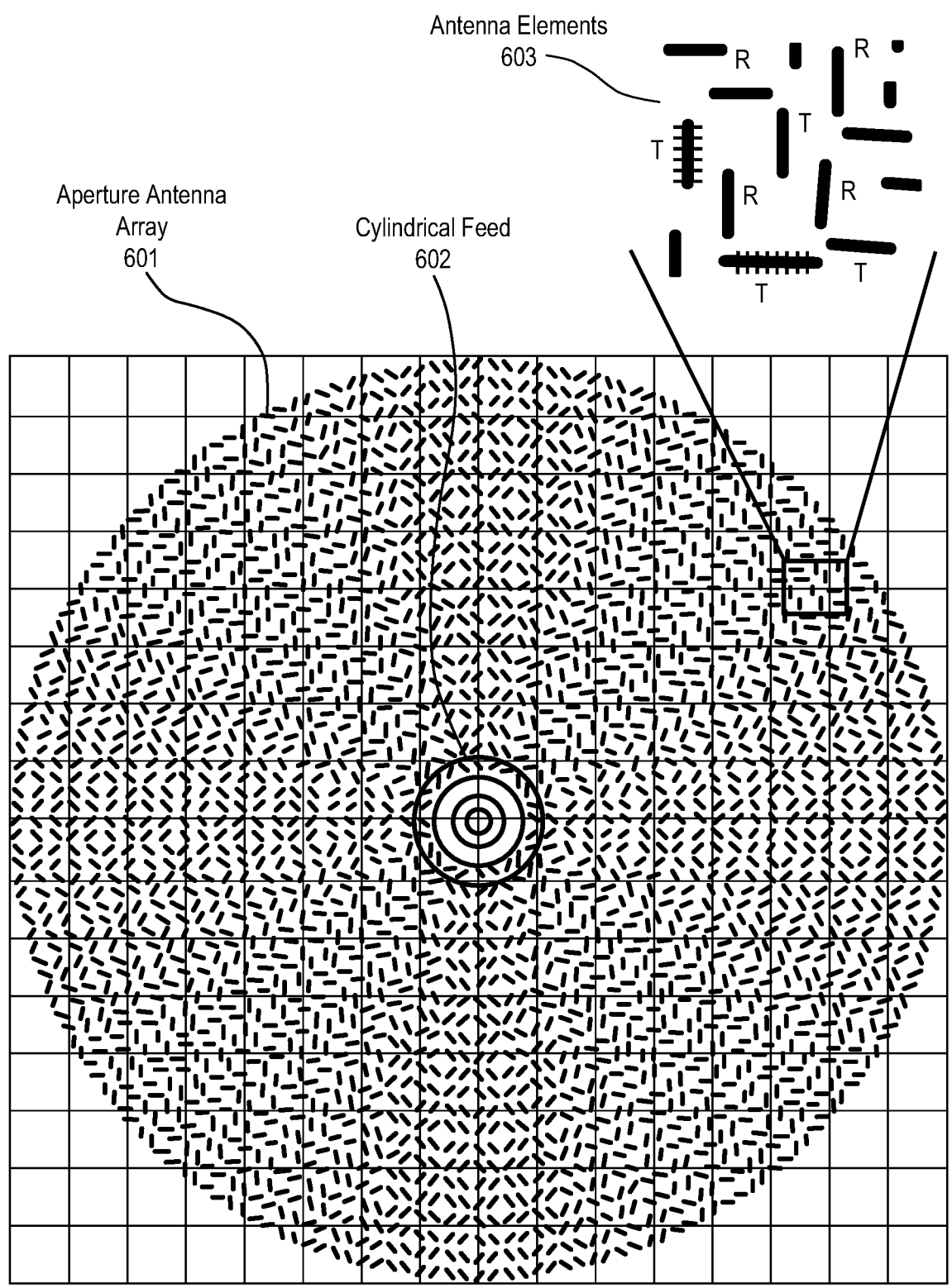
FIG. 6 illustrates the schematic of one embodiment of a cylindrically fed holographic radial aperture antenna.

FIG. 6 illustrates the schematic of one embodiment of a cylindrically fed holographic radial aperture antenna. Referring to FIG. 6, the antenna aperture has one or more arrays 601 of antenna elements 603 that are placed in concentric rings around an input feed 602 of the cylindrically fed antenna. In one embodiment, antenna elements 603 are radio frequency (RF) resonators that radiate RF energy. In one embodiment, antenna elements 603 comprise both Rx and Tx irises that are interleaved and distributed on the whole surface of the antenna aperture. Such Rx and Tx irises, or slots, may be in groups of three or more sets where each set is for a separately and simultaneously controlled band. Examples of such antenna elements with irises are described in greater detail below. Note that the RF resonators described herein may be used in antennas that do not include a cylindrical feed.

In one embodiment, the antenna includes a coaxial feed that is used to provide a cylindrical wave feed via input feed 602. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 603 comprise irises and the aperture antenna of FIG. 6 is used to generate a main beam shaped by using excitation from a cylindrical feed wave for radiating irises through tunable liquid crystal (LC) material. In one embodiment, the antenna can be excited to radiate a horizontally or vertically polarized electric field at desired scan angles.

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure (of surface scattering antenna elements such as described herein), while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to form receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 7:
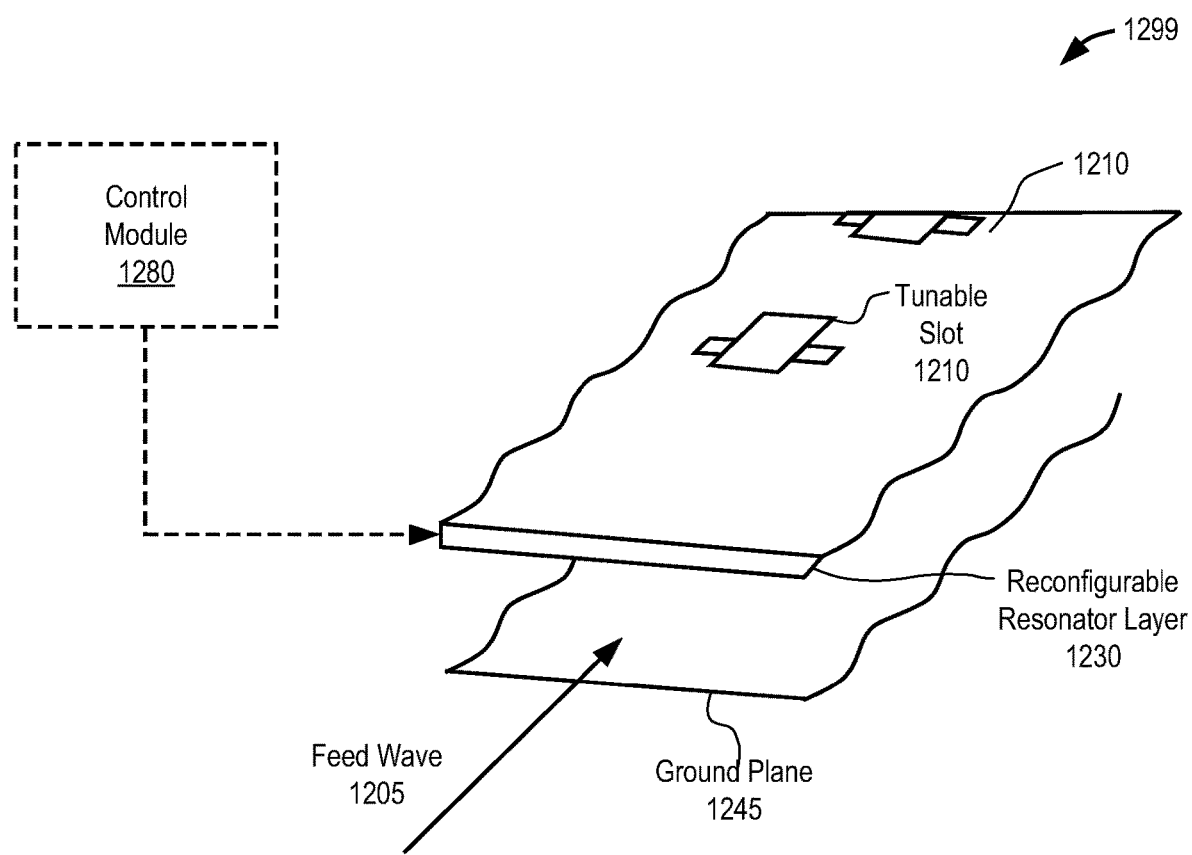
FIG. 7 illustrates a perspective view of one row of antenna elements that includes a ground plane and a reconfigurable resonator layer.

FIG. 7 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Figure 8A:
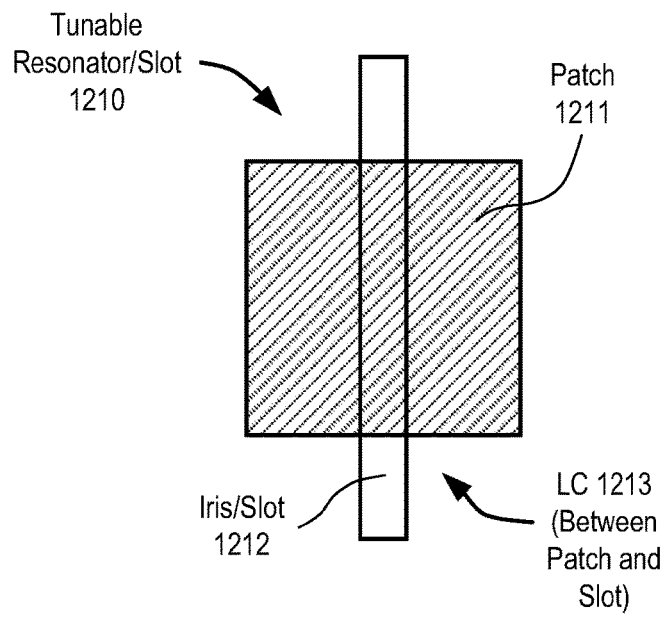
FIG. 8A illustrates one embodiment of a tunable resonator/slot.

Control module, or controller, 1280 is coupled to reconfigurable resonator layer 1230 to modulate the array of tunable slots 1210 by varying the voltage across the liquid crystal in FIG. 8A. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram} = w_{in} * w_{out}$, with $w_{in}$ as the wave equation in the waveguide and $w_{out}$ the wave equation on the outgoing wave.

FIG. 8A illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 8B:
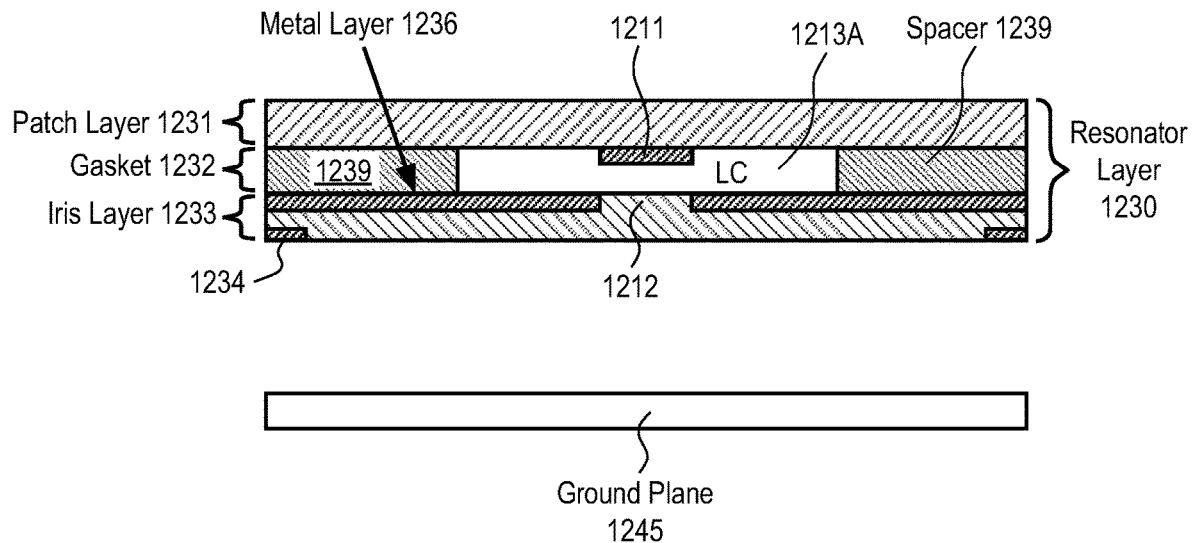
FIG. 8B illustrates a cross section view of one embodiment of a physical antenna aperture.

FIG. 8B illustrates a cross section view of one embodiment of a physical antenna aperture. The antenna aperture includes ground plane 1245, and a metal layer 1236 within iris layer 1233, which is included in reconfigurable resonator layer 1230. In one embodiment, the antenna aperture of FIG. 8B includes a plurality of tunable resonator/slots 1210 of FIG. 8A. Iris/slot 1212 is defined by openings in metal layer 1236. A feed wave, such as feed wave 1205 of FIG. 8A, may have a microwave frequency compatible with satellite communication channels. The feed wave propagates between ground plane 1245 and resonator layer 1230.

Reconfigurable resonator layer 1230 also includes gasket layer 1232 and patch layer 1231. Gasket layer 1232 is disposed between patch layer 1231 and iris layer 1233. Note that in one embodiment, a spacer could replace gasket layer 1232. In one embodiment, iris layer 1233 is a printed circuit board ("PCB") that includes a copper layer as metal layer 1236. In one embodiment, iris layer 1233 is glass. Iris layer 1233 may be other types of substrates.

Openings may be etched in the copper layer to form slots 1212. In one embodiment, iris layer 1233 is conductively coupled by a conductive bonding layer to another structure (e.g., a waveguide) in FIG. 8B. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1232 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 8B includes multiple tunable resonator/slots, such as tunable resonator/slot 1210 includes patch 1211, liquid crystal 1213, and iris 1212 of FIG. 8A. The chamber for liquid crystal 1213 is defined by spacers 1239, iris layer 1233 and metal layer 1236. When the chamber is filled with liquid crystal, patch layer 1231 can be laminated onto spacers 1239 to seal liquid crystal within resonator layer 1230.

A voltage between patch layer 1231 and iris layer 1233 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $$f = \frac{1}{2\pi\sqrt{LC}}$$

where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by λ/5. Other spacings may be used. In one embodiment, each tunable slot in a row is spaced from the closest tunable slot in an adjacent row by λ/2, and, thus, commonly oriented tunable slots in different rows are spaced by λ/4, though other spacings are possible (e.g., λ/5, λ/6.3). In another embodiment, each tunable slot in a row is spaced from the closest tunable slot in an adjacent row by λ/3.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 9A-D illustrate one embodiment of the different layers for creating the slotted array. The antenna array includes antenna elements that are positioned in rings, such as the example rings shown in FIG. 1A. Note that in this example the antenna array has two different types of antenna elements that are used for two different types of frequency bands.

Figure 9A:
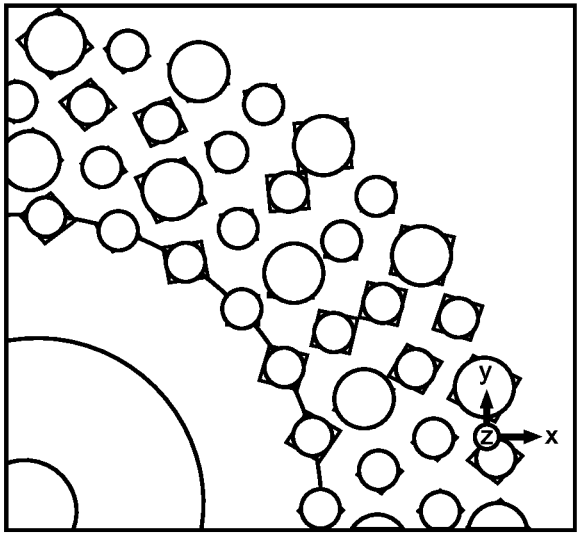
FIGS. 9A-D illustrate one embodiment of the different layers for creating the slotted array.
Figure 9B:
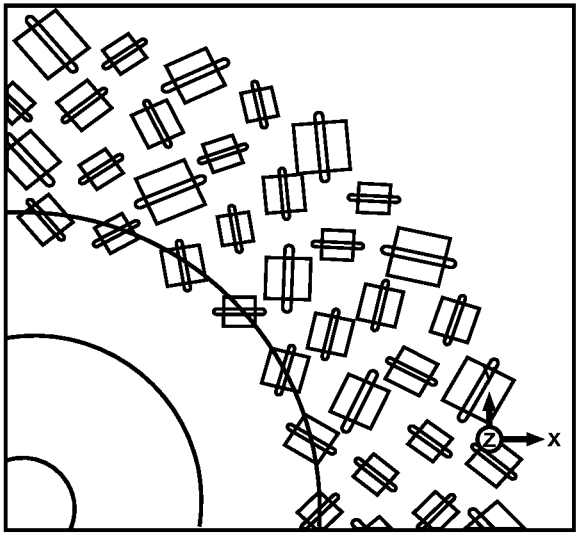
Figure 9C:
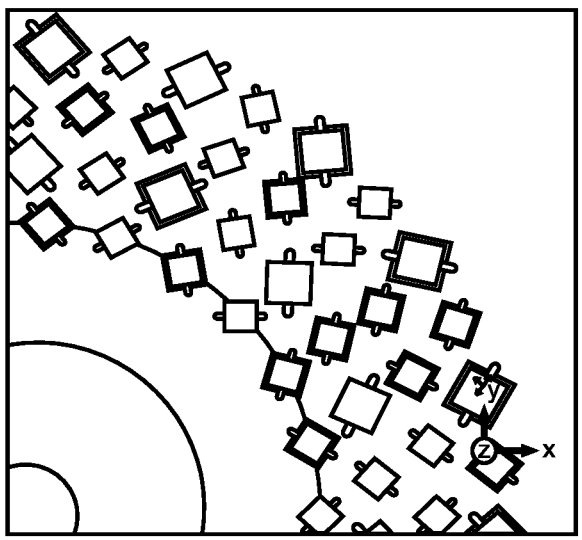
Figure 9D:
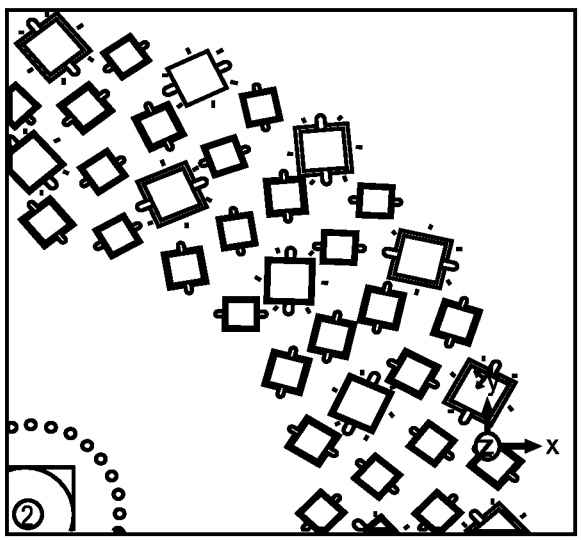

FIG. 9A illustrates a portion of the first iris board layer with locations corresponding to the slots. Referring to FIG. 9A, the circles are open areas/slots in the metallization in the bottom side of the iris substrate, and are for controlling the coupling of elements to the feed (the feed wave). Note that this layer is an optional layer and is not used in all designs. FIG. 9B illustrates a portion of the second iris board layer containing slots. FIG. 9C illustrates patches over a portion of the second iris board layer. FIG. 9D illustrates a top view of a portion of the slotted array.

Figure 10:
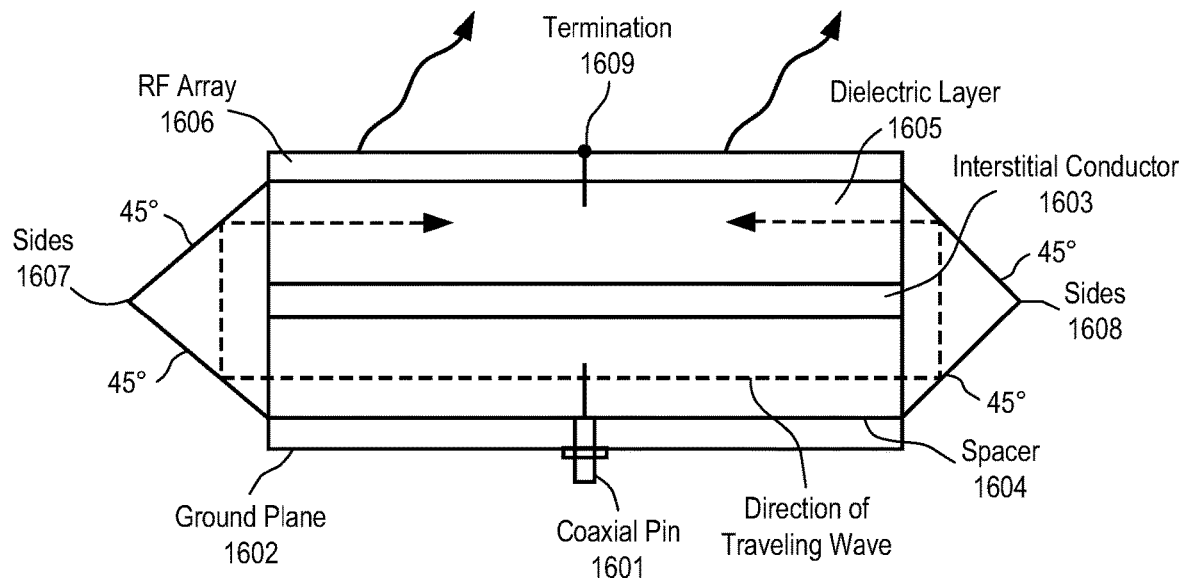
FIG. 10 illustrates a side view of one embodiment of a cylindrically fed antenna structure.

FIG. 10 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 10 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 10, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602.

Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be λ/2, where λ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 450 angles. In an alternative embodiment, sides 1607 and 1608 could be replaced with a continuous radius to achieve the reflection. While FIG. 10 shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 11:
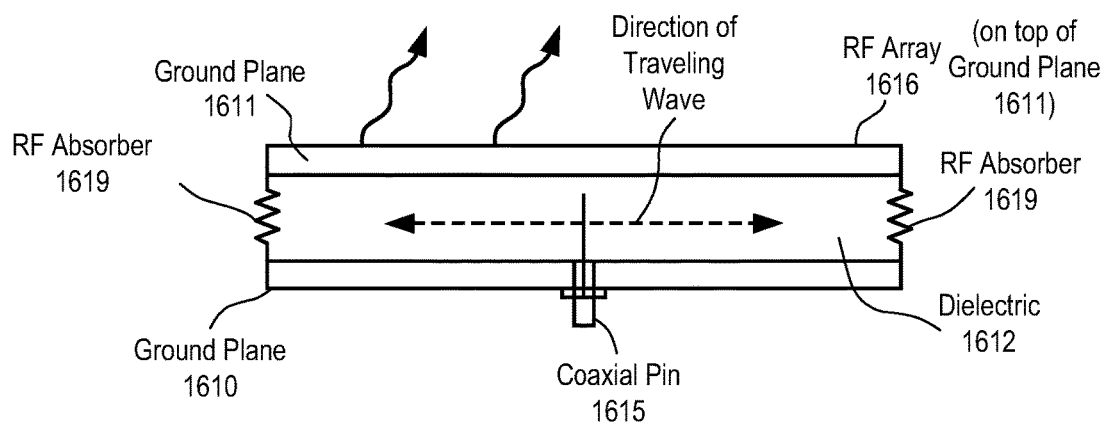
FIG. 11 illustrates another embodiment of the antenna system with an outgoing wave.

FIG. 11 illustrates another embodiment of the antenna system with an outgoing wave. Referring to FIG. 11, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Q) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 10 and 11 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 10 and RF array 1616 of FIG. 11 include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 12:
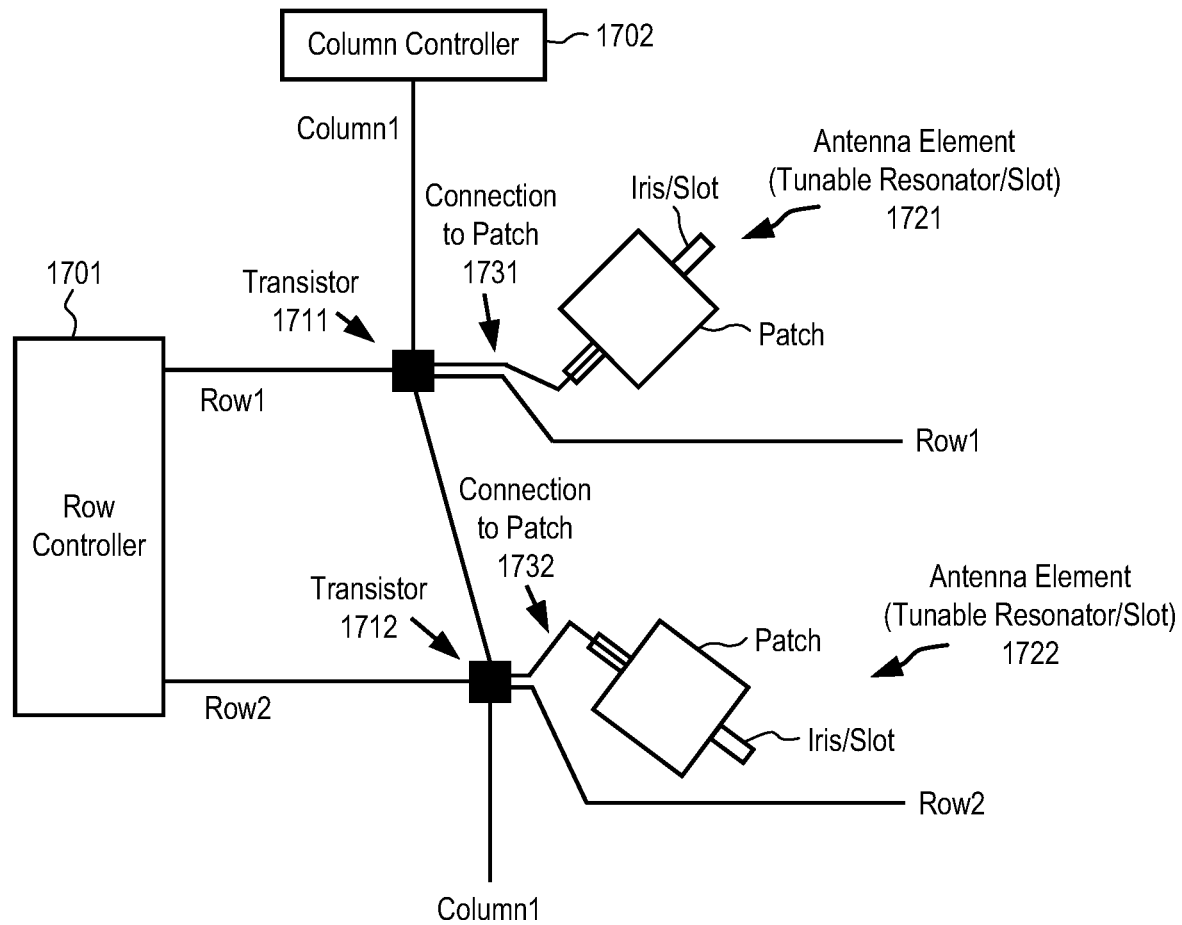
FIG. 12 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 12 illustrates one embodiment of the placement of matrix drive circuitry with respect to antenna elements. Referring to FIG. 12, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is pre-defined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 13:
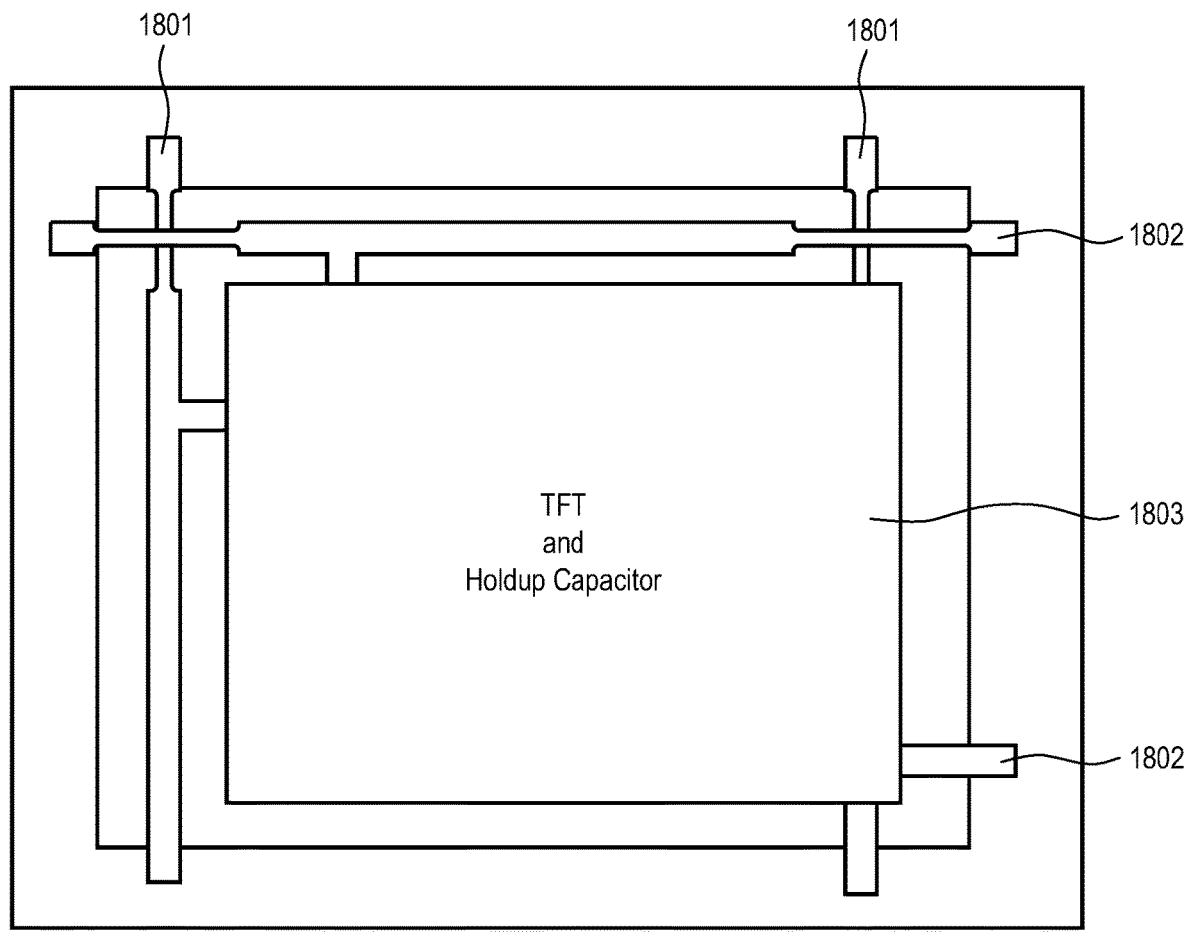
FIG. 13 illustrates one embodiment of a TFT package.

In one embodiment, a TFT package is used to enable placement and unique addressing in the matrix drive. FIG. 13 illustrates one embodiment of a TFT package. Referring to FIG. 13, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 14:
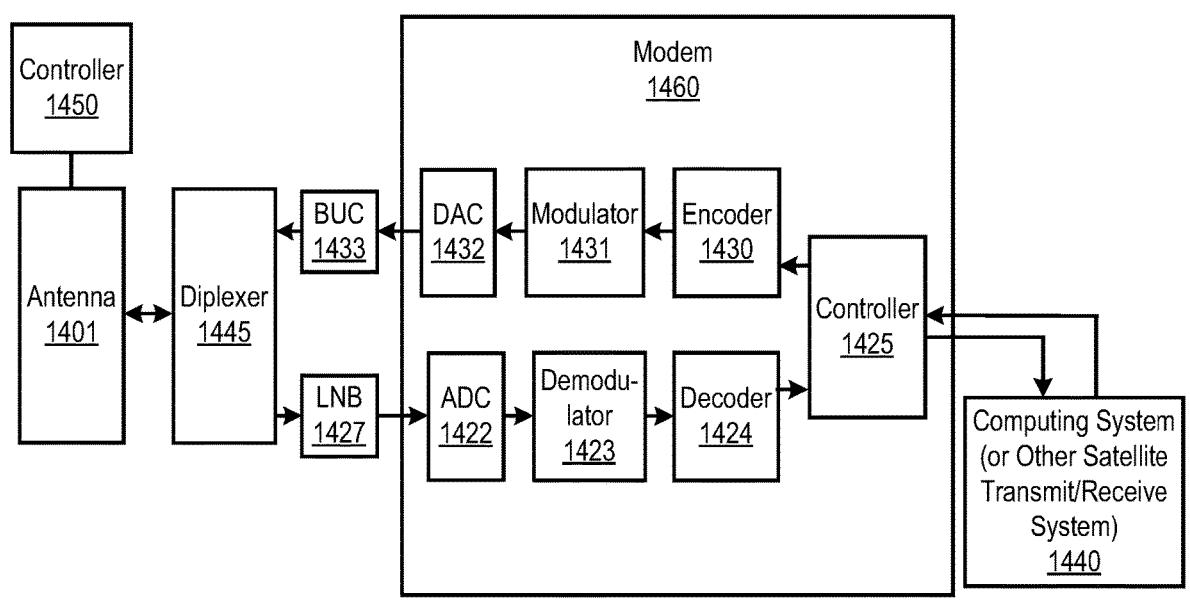
FIG. 14 is a block diagram of one embodiment of a communication system having simultaneous transmit and receive paths.

In another embodiment, the combined antenna apertures are used in a full duplex communication system. FIG. 14 is a block diagram of an embodiment of a communication system having simultaneous transmit and receive paths. While only one transmit path and one receive path are shown, the communication system may include more than one transmit path and/or more than one receive path.

Referring to FIG. 14, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNBs) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (upconvert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 14 has a number of applications, including but not limited to, internet communication, vehicle communication (including software updating), etc.

There is a number of example embodiments described herein.

Example 1 is a portable antenna comprising: a memory; an antenna aperture with a plurality of electronically controlled radio frequency (RF) radiating antenna elements; a pattern generator, including one or more processors, to generate a plurality of patterns to apply to the antenna aperture during testing to cause the antenna to generate a beam in response to each pattern of the plurality of patterns while pointing at a satellite; a receiver to receive satellite signals from the satellite in response to generating beams with the aperture; a metric provider, including one or more processors, to generate one or more satellite signal metrics for the received satellite signals; and antenna parameter selector to select one or more parameters associated with beamforming based on the satellite signal metrics indicating antenna performance reached a predetermined level, wherein selection of the one or more parameters is for storage in the memory and used to generate a beam with the antenna aperture when performing data communication.

Example 2 is the antenna of example 1 that may optionally include that the antenna performance is for an operating frequency of the satellite Example 3 is the antenna of example 1 that may optionally include that each of the plurality of patterns are generated based on beamforming parameters optimized for gain at the operating frequency using satellite signal feedback metrics.

Example 4 is the antenna of example 3 that may optionally include that at least one of the beamforming parameters for one or more patterns is selected using a genetic algorithm.

Example 5 is the antenna of example 1 that may optionally include that the satellite signal metrics include an indication of pattern performance.

Example 6 is the antenna of example 5 that may optionally include that the indication of pattern performance comprises one or more of gain, side lobe levels, beam width, cross-polarization discrimination, instantaneous bandwidth, and total data throughput.

Example 7 is the antenna of example 1 that may optionally include that generation of the plurality of patterns and satellite signal metrics are part of a self-optimization process performed on the antenna.

Example 8 is the antenna of example 7 that may optionally include that the self-optimization process is performed while the antenna is not being moved and tracking on the antenna is turned off.

Example 9 is the antenna of example 8 that may optionally include that wherein movement of the antenna is determined based on based on loss of synchronization to a digitally modulated signal being received from the satellite.

Example 10 is the antenna of example 8 that may optionally include that incoming commands to the antenna are not performed while in the self-optimization process.

Example 11 is the antenna of example 1 that may optionally include that generation of the plurality of patterns and satellite signal metrics are part of a process for verifying tunable bandwidth of the antenna.

Example 12 is the antenna of example 11 that may optionally include that the process for verifying tunable bandwidth of the antenna includes determining, by a processor, a bandwidth range to test, commanding a new antenna patterns to tune the RF response around a set of modulation frequencies that cover the bandwidth range, using the receiver to receive at each modulation frequencies and record a value.

Example 13 is the antenna of example 1 that may optionally include that the receiver is part of tracking receiver hardware on the antenna.

Example 14 is the antenna of example 1 that may optionally include that the RF radiating antenna elements are metamaterial antenna elements.

Example 15 is a method comprising: performing a testing process that includes generating a plurality of patterns to apply to an antenna aperture during testing to cause the antenna to generate a beam in response to each pattern of the plurality of patterns while pointing at a satellite, the antenna aperture having a plurality of electronically controlled radio frequency (RF) radiating antenna elements, receiving satellite signals from the satellite in response to generating beams with the aperture, generating one or more satellite signal metrics for the received satellite signals, and selecting one or more parameters associated with beamforming based on the satellite signal metrics indicating antenna performance reached a predetermined level; and generating a beam with the antenna aperture when performing data communication with the satellite.

Example 16 is the method of example 15 that may optionally include that the antenna performance is for an operating frequency of the satellite.

Example 17 is the method of example 16 that may optionally include that each of the plurality of a patterns are generated based on beamforming parameters optimized for gain at the operating frequency using satellite signal feedback metrics.

Example 18 is the method of example 17 that may optionally include that at least one of the beamforming parameters for one or more patterns is selected using a genetic algorithm.

Example 19 is the method of example 15 that may optionally include that the satellite signal metrics include an indication of pattern performance.

Example 20 is the method of example 15 that may optionally include that the indication of pattern performance comprises one or more of gain, side lobe levels, beam width, cross-polarization discrimination, instantaneous bandwidth, and total data throughput.

Example 21 is the method of example 15 that may optionally include that generation of the plurality of patterns and satellite signal metrics are part of a self-optimization process performed on the antenna.

Example 22 is the method of example 21 that may optionally include that the self-optimization process is performed while the antenna is not being moved, tracking on the antenna is turned off, and incoming commands to the antenna are not performed while in the self-optimization process.

Example 23 is the method of example 15 that may optionally include that the receiver is part of tracking receiver hardware on the antenna.

Example 24 is the method of example 15 that may optionally include that generation of the plurality of patterns and satellite signal metrics are part of a process for verifying tunable bandwidth of the antenna.

Example 25 is the method of example 24 that may optionally include that the process for verifying tunable bandwidth of the antenna includes determining, by a processor, a bandwidth range to test, commanding a new antenna patterns to tune the RF response around a set of modulation frequencies that cover the bandwidth range, using the receiver to receive at each modulation frequencies and record a value.

Example 26 is an article of manufacture having one or more non-transitory computer readable media storing instruction thereon which, when executed by a system, cause the system to perform a method comprising: performing a testing process that includes generating a plurality of patterns to apply to an antenna aperture during testing to cause the antenna to generate a beam in response to each pattern of the plurality of patterns while pointing at a satellite, the antenna aperture having a plurality of electronically controlled radio frequency (RF) radiating antenna elements; receiving satellite signals from the satellite in response to generating beams with the aperture, generating one or more satellite signal metrics for the received satellite signals, and selecting one or more parameters associated with beamforming based on the satellite signal metrics indicating antenna performance reached a predetermined level.

Example 27 is the article of manufacture of example 26 that may optionally include that the antenna performance is for an operating frequency of the satellite, and wherein each of the plurality of patterns is generated based on beamforming parameters optimized for gain at the operating frequency using satellite signal feedback metrics.

Example 28 is the article of manufacture of example 26 that may optionally include that generation of the plurality of patterns and satellite signal metrics are part of a self-optimization process performed on the antenna.

Example 29 is the article of manufacture of example 28 that may optionally include that the self-optimization process is performed while the antenna is not being moved, tracking on the antenna is turned off, and incoming commands to the antenna are not performed while in the self-optimization process.

Example 30 is the article of manufacture of example 26 that may optionally include that generation of the plurality of patterns and satellite signal metrics are part of a process for verifying tunable bandwidth of the antenna.

Example 31 is the article of manufacture of example 30 that may optionally include that the process for verifying tunable bandwidth of the antenna includes determining, by a processor, a bandwidth range to test, commanding a new antenna patterns to tune the RF response around a set of modulation frequencies that cover the bandwidth range, using the receiver to receive at each modulation frequencies and record a value.

Example 32 is a method for testing an electronically steered antenna comprising: verifying tunable bandwidth of the electronically steered antenna without using a chamber by (a) determining if the antenna is communicably coupled to a satellite, (b) determining a bandwidth range to test, (c) commanding a new antenna pattern with respect to a commanded frequency drop, (d) generating new patterns for the frequency, (e) setting the receiver of the satellite to receive that the frequency and recording a value, and (f) repeating (c)-(e) for the bandwidth range.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A portable antenna comprising:
   a memory;
   an antenna aperture with a plurality of electronically controlled radio frequency (RF) radiating antenna elements;
   a controller having one or more processors, wherein the one or more processors are configured to
      perform a self-optimization process that includes verifying tunable bandwidth of the antenna, the self-optimization process including
         generating a plurality of patterns to apply to the antenna aperture during testing to cause the antenna to generate a beam in response to each pattern of the plurality of patterns while pointing at a satellite;
         generating one or more satellite signal metrics based on received satellite signals; and
         selecting one or more parameters associated with beamforming based on satellite signal metrics indicating antenna performance reached a predetermined level, wherein selected parameters are stored in the memory; and
      accessing the stored parameters and generating a beam with the antenna aperture when performing data communication.

2. The portable antenna of claim 1, wherein the self-optimization process is performed while the antenna is not being moved.

3. The portable antenna of claim 2, wherein the self-optimization process is performed while tracking on the antenna is turned off.

4. The portable antenna defined in claim 1 further comprising a receiver to receive satellite signals from a satellite, wherein the self-optimization process further comprises determining, by a processor, a bandwidth range to test, commanding new antenna patterns to tune the RF response around a set of modulation frequencies that cover the bandwidth range, using the receiver to receive signals at each of the modulation frequencies in the set and recording at least one value associated with each received signal for use in generating the one or more signal metrics.

5. The portable antenna of claim 1, wherein each of the plurality of patterns are generated based on beamforming parameters optimized for gain at an operating frequency using satellite signal feedback metrics.

6. The antenna defined in claim 5, wherein at least one of the beamforming parameters for one or more patterns is selected using a genetic algorithm.

7. The portable antenna of claim 1, wherein the satellite signal metrics include an indication of pattern performance, wherein the indication of pattern performance comprises one or more of gain, side lobe levels, beam width, cross-polarization discrimination, instantaneous bandwidth, and total data throughput.

8. The portable antenna of claim 1, further wherein movement of the antenna is determined based on based on loss of synchronization to a digitally modulated signal being received from the satellite.

9. The portable antenna of claim 1, wherein incoming commands to the antenna are prevented from being performed while in the self-optimization process.

10. The portable antenna defined in claim 1, further comprising a receiver to receive satellite signals from a satellite, wherein the receiver is part of tracking receiver hardware on the antenna.

11. The portable antenna defined in claim 1, wherein the RF radiating antenna elements are metamaterial antenna elements.

12. A method for testing an electronically steered antenna comprising:
   verifying tunable bandwidth of the electronically steered antenna with an antenna aperture, via one or more processors, by
      generating a plurality of patterns to apply to an antenna aperture during testing to cause the antenna to generate a beam in response to each pattern of the plurality of patterns while pointing at a first satellite,
      generating one or more satellite signal metrics associated with satellite signals received by the antenna aperture while the plurality of patterns are applied to the antenna aperture, and
      setting one or more parameters for controlling operation of the antenna based on the satellite signal metrics indicating antenna performance reached a predetermined level.

13. The method of claim 12, wherein the one or more parameters are associated with beamforming.

14. The method of claim 12, wherein verifying tunable bandwidth of the electronically steered antenna with an antenna aperture is performed without using a chamber.

15. The method of claim 12, wherein generating a plurality of patterns is part of a self-optimization process performed by the antenna.

16. The method of claim 12, wherein generating one or more satellite signal metrics is part of a self-optimization process performed by the antenna.

17. The method of claim 12, wherein generating a plurality of patterns and generating one or more satellite signal metrics are performed while the antenna is not being moved.

18. The method of claim 12, wherein generating a plurality of patterns and generating one or more satellite signal metrics are performed while tracking on the antenna is turned off.

19. The method defined in claim 12 further comprising:
   receiving satellite signals, via a receiver, from the satellite,
   wherein verifying tunable bandwidth of the antenna further comprises determining, by a processor, a bandwidth range to test, commanding new antenna patterns to tune the RF response around a set of modulation frequencies that cover the bandwidth range, using the receiver to receive signals at each of the modulation frequencies in the set and recording at least one value associated with each received signal for use in generating the one or more signal metrics.

20. The method of claim 12, further comprising generating a beam in response to each pattern of the plurality of patterns using the antenna aperture.

21. The method of claim 12, further comprising:
generating a beam with the antenna aperture after setting the one or more parameters when performing data communication with a second satellite; and
receiving satellite signals from the satellite in response to generating beams with the aperture.

22. The method of claim 12, further comprising preventing incoming commands to the antenna from being performed while verifying tunable bandwidth of the electronically steered antenna with an antenna aperture.

23. The method of claim 12, wherein each of the plurality of a patterns are generated based on beamforming parameters optimized for gain at an operating frequency using satellite signal feedback metrics, and wherein at least one of the beamforming for one or more patterns is selected using a genetic algorithm.

24. The method of claim 12, wherein the satellite signal metrics include an indication of pattern performance.

25. The method of claim 12, wherein the indication of pattern performance comprises one or more of gain, side lobe levels, beam width, cross-polarization discrimination, instantaneous bandwidth, and total data throughput.

26. An article of manufacture having one or more non-transitory computer readable media storing instruction thereon which, when executed by a system, cause the system to perform a method for testing an electronically steered antenna comprising: verifying tunable bandwidth of the electronically steered antenna with an antenna aperture, via one or more processors, by generating a plurality of patterns to apply to an antenna aperture during testing to cause the antenna to generate a beam in response to each pattern of the plurality of patterns while pointing at a first satellite, generating one or more satellite signal metrics associated with satellite signals received by the antenna aperture while the plurality of patterns are applied to the antenna aperture, and setting one or more parameters for controlling operation of the antenna based on the satellite signal metrics indicating antenna performance reached a predetermined level.

\* \* \* \* \*